United States Patent [19]

Kondo et al.

[11] Patent Number: 4,836,916
[45] Date of Patent: Jun. 6, 1989

[54] HANDLING APPARATUS FOR MAGNETIC RECORDING DISKS

[75] Inventors: Thomas J. Kondo, Phoenix; James F. Kusbel, Scottsdale; John D. Philp, Phoenix, all of Ariz.

[73] Assignee: Three Phoenix Company, Phoenix, Ariz.

[21] Appl. No.: 565,039

[22] Filed: Dec. 23, 1983

[51] Int. Cl.⁴ .................. B07C 5/344; G01R 33/12
[52] U.S. Cl. .................................. 209/538; 209/567; 209/573; 209/655; 209/933; 324/212; 360/25; 360/99.01; 369/58
[58] Field of Search ............... 209/538, 546, 549, 551, 209/552, 559, 562–564, 567, 568, 571, 573, 600, 655, 698, 706, 914, 933; 271/149, 150; 324/210–212; 360/25, 99; 364/481, 579, 580; 369/58

[56] References Cited

U.S. PATENT DOCUMENTS

| | | | |
|---|---|---|---|
| 2,338,400 | 1/1944 | Bogue | 209/706 X |
| 4,234,418 | 11/1980 | Boissicat | 209/573 X |
| 4,347,535 | 8/1982 | Dalziel | 360/99 |

OTHER PUBLICATIONS

IBM Technical Disclosure Bulletin, vol. 22, No. 3, pp. 905–906, Aug. 1979, A. T. Fletcher & L. K. Whitted.
IBM Technical Disclosure Bulletin, vol. 22, No. 3, pp. 907–909, Aug. 1979, A. T. Fletcher, R. W. Holmes, W. A. Maurer & L. K. Whitted, 324-212.

*Primary Examiner*—Robert B. Reeves
*Assistant Examiner*—Edward M. Wacyra
*Attorney, Agent, or Firm*—Harry M. Weiss

[57] ABSTRACT

An automatic disk testing apparatus and method for testing flexible disks is disclosed. The apparatus includes a gravity feed disk hopper and vacuum disk plate which sequentially present a series of disks for test. Each disk drops by gravity from the vacuum disk plate to a test position including a drive mechanism. The drive mechanism rotates the disk, in its disk jacket, at a predetermined rotational speed for testing. Each disk is tested and the test results are stored in memory. After testing, the disk is automatically sorted and moved to an output location based on the test results. The sorting is accomplished by dropping the tested disk into a motor driven shuttle which conveys the disk to the proper output location and drops the disk at that location.

20 Claims, 4 Drawing Sheets

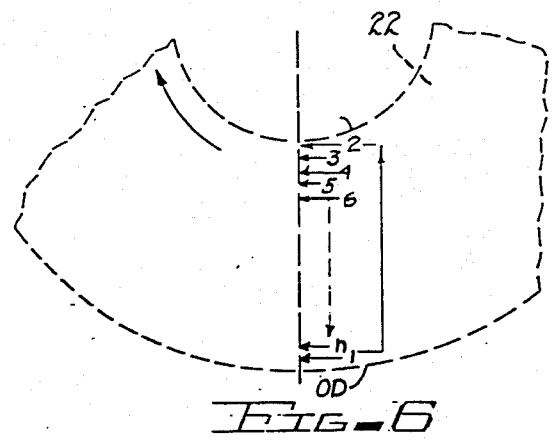
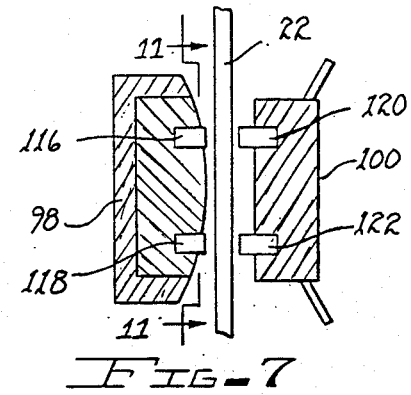
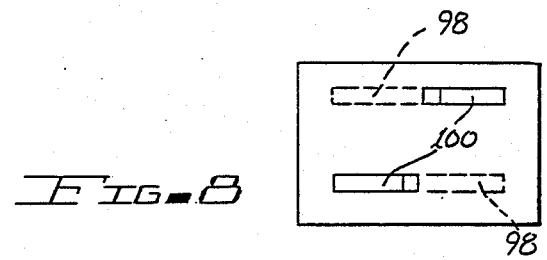
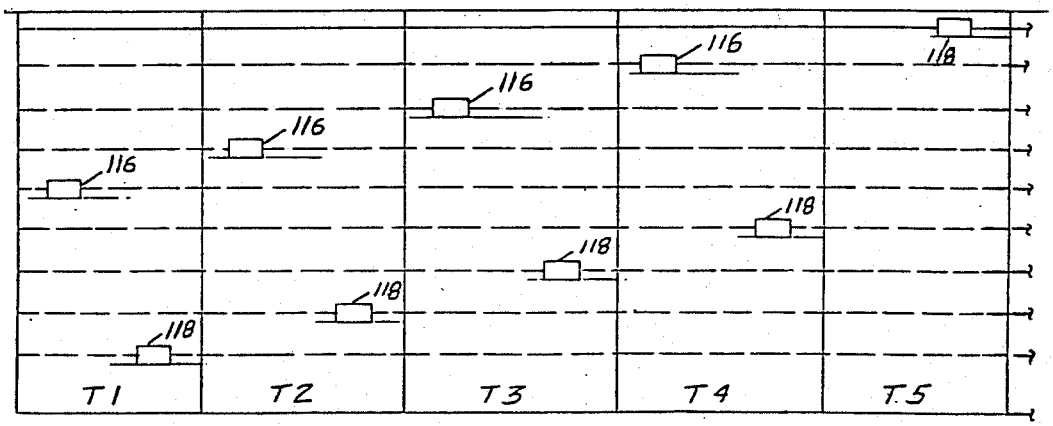

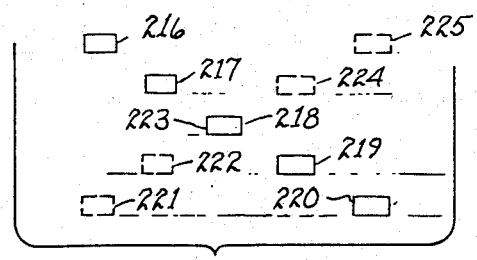
_FIG-10_
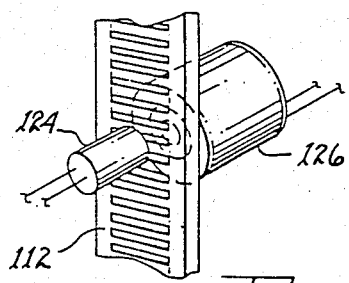
_FIG-11_
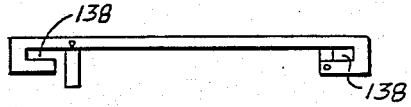
_FIG-13A_
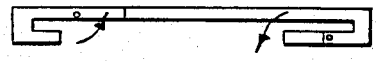
_FIG-13B_
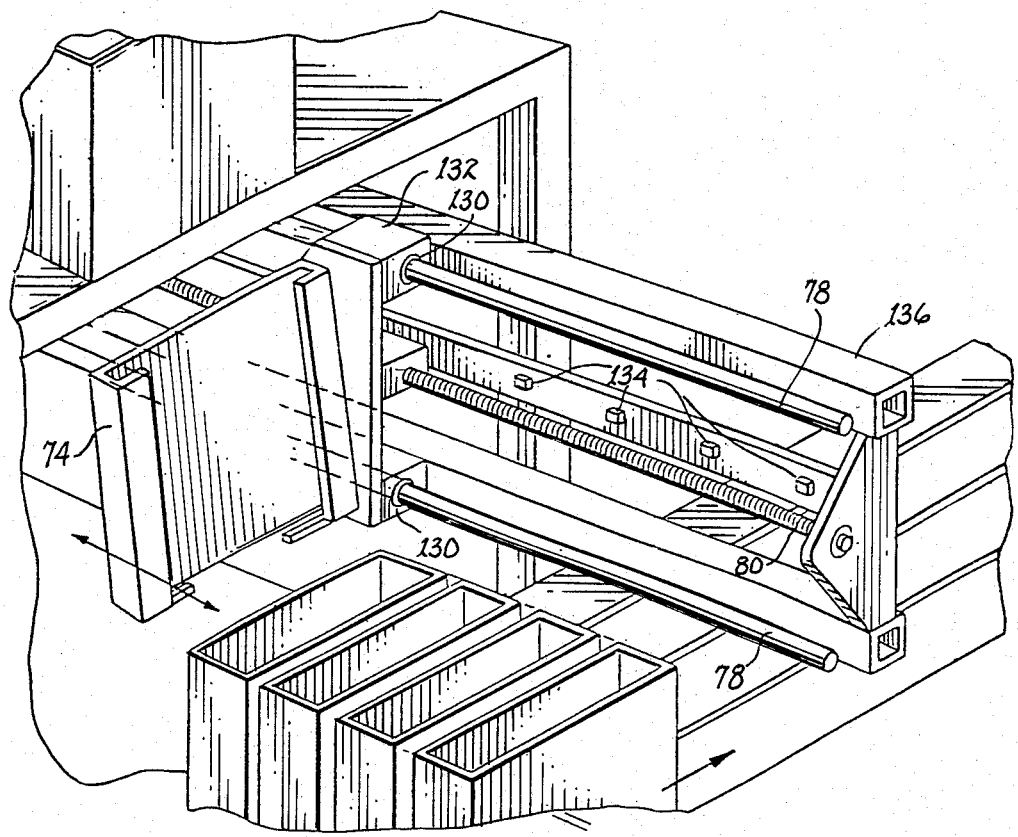
_FIG-12_

HANDLING APPARATUS FOR MAGNETIC RECORDING DISKS

BACKGROUND OF THE INVENTION

This invention relates generally to apparatus and method for testing flexible disks, and more specifically to an automated equipment and method for testing and sorting flexible disks.

FIELD OF THE INVENTION

Flexible disks are used for mass storage in computer applications. The disks may be, for example, 5 1/4 inches in diameter, 8 inches in diameter, or about 3 inches in diameter. The disks are used to store many thousands of bytes of computer information. In some applications, information is stored on one side of the disk, while in other applications information is stored on both sides of the disk. Information storage must be precise and totally accurate. This requires that the disk, in turn, be of high quality and without flaws. To insure that disks are of such quality, each disk used in a computer application must be carefully tested and screened for quality control.

Disk testing can be time consuming, which, of course, adds to the final cost of the disk. To reduce the testing costs, it is imperative that disk testing be done as rapidly as possible and with as little operator input as possible. There is, therefore, a need for a testing apparatus and method which would automatically test and sort a plurality of flexible disks in a rapid manner without requiring large amounts of operator handling.

It is therefore an object of this invention to provide an improved and automated disk testing apparatus.

It is a further object of this invention to provide a automated method for testing flexible disks.

It is yet another object of this invention to provide an improved apparatus and method for sorting flexible disks tested in a flexible disk testing apparatus.

BRIEF SUMMARY OF THE INVENTION

The foregoing and other objects and advantages are achieved with the automated disk testing apparatus and method, both in accordance with the invention. The automated disk testing apparatus includes a gravity feed hopper into which a plurality of flexible disks, in standard jackets, are loaded. The standard jacket that is referred to is the American National Standard Institute (ANSI) specified in their document number X3B8/82-39 dated June 11, 1982. The standard jacket disclosed herein is preferably tested with its top flap opened or in an unsealed position to permit easier access to the flexible disk contained therein, but it can also permit testing with top flap closed or sealed. A vacuum disk plate pulls disks from the hopper, one at a time, and drops them into a drive mechanism. The drive mechanism positions and clamps the disks and then rotates the disk at a predetermined rotational speed for testing. During testing the rotating disk is contacted by two disk test heads (one on each side of the disk with each head having two read/write cores) which perform the necessary tests and provide test results for storage. The apparatus then disengages the disk from the drive mechanism and drops it into a sort shuttle frame. The sort shuttle frame transports the disk to a location selected in response to the stored test results, and releases the disk at that selected location.

BRIEF DESCRIPTION OF THE DRAWINGS

FIG. 6 illustrates track locations tested on a flexible disk;

FIGS. 7 and 8 illustrate read/write test heads;

FIG. 9 illustrates a testing pattern for simultaneously testing two tracks on each side of a disk;

FIG. 10 illustrates an alternate embodiment having five read/write heads per test head;

FIG. 11 illustrates ground glass scale and photo optic detector for positioning read/write test heads;

FIG. 12 illustrates the sort shuttle platen; and

FIGS. 13A and 13B illustrates a release mechanism at the bottom of the sort shuttle platen.

DETAILED DESCRIPTION OF THE INVENTION

Figure 1:
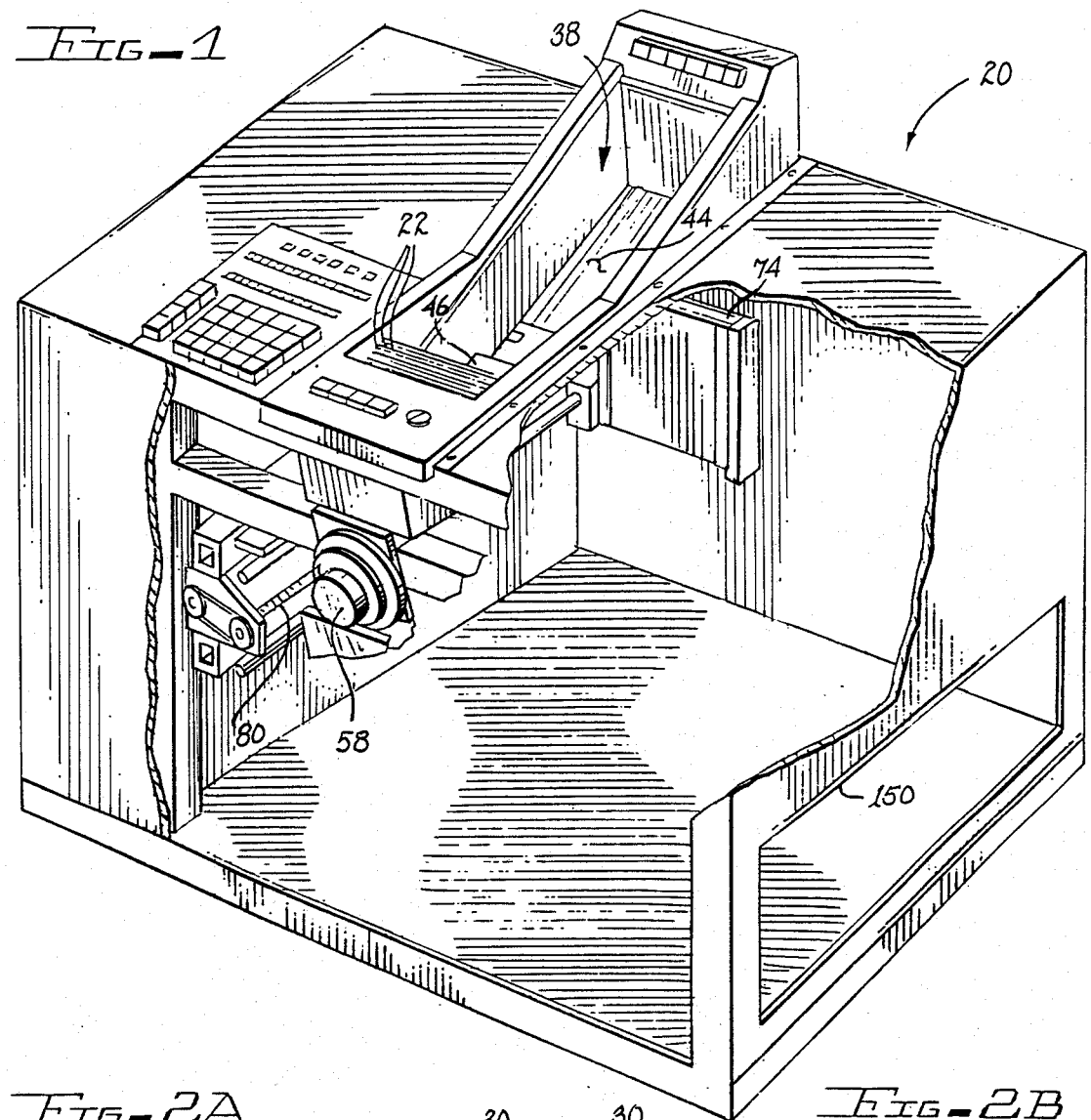
FIG. 1 illustrates automated test equipment in a partially cut away perspective view.

Automated disk testing apparatus 20 is illustrated in FIG. 1 in a partially cut away perspective view. This apparatus provides for the rapid testing and sorting of a plurality of flexible disks. A preferred embodiment of the disk testing apparatus will be described, although it is not intended that the invention be limited to this preferred embodiment. Those skilled in the art will of course recognize that variations and modifications differing from this preferred embodiment can be made without departing from the spirit and scope of the invention.

Figure 2A:
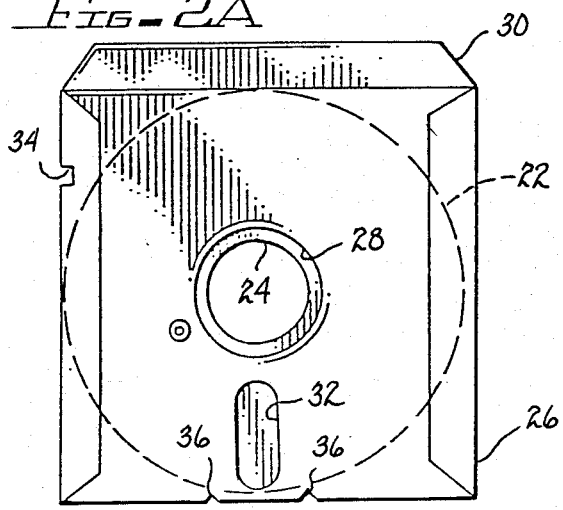
FIGS. 2a and 2b illustrate the flexible disk to be tested in its standard disk jacket.
Figure 2B:
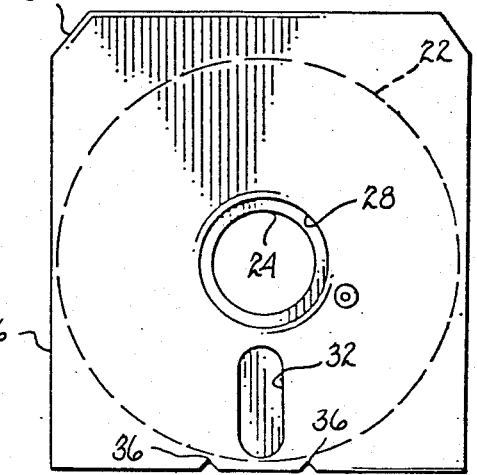

FIGS. 2a and 2b illustrate the front and back, respectively, of a standard 5.25 inch double sided flexible disk 22. It is just such a disk that is intended to be tested by apparatus 20. Apparatus 20, however, can be adapted for the testing of similar disks of different size by appropriate changes in the size of the apparatus. Disk 22 has an aperture 24 through the center thereof. The disk is contained in a standard disk jacket 26; the disk jacket, similarly, has an aperture 28 through the center thereof exposing the aperture 24 in the disk. Jacket 26 is here shown with jacket flap 30 in the open or up position. The apparatus allows for testing with the jacket flap either open or closed. The jacket also includes a head window opening 32 which exposes a portion of the tracks on the surface of disk 22. A Write Control notch 34 appears on the upper portion of one side of the jacket. This notch is operative during normal use of the disk in a read/write mode. Relief notches 36 also appear at the bottom of the disk jacket.

Figure 3:
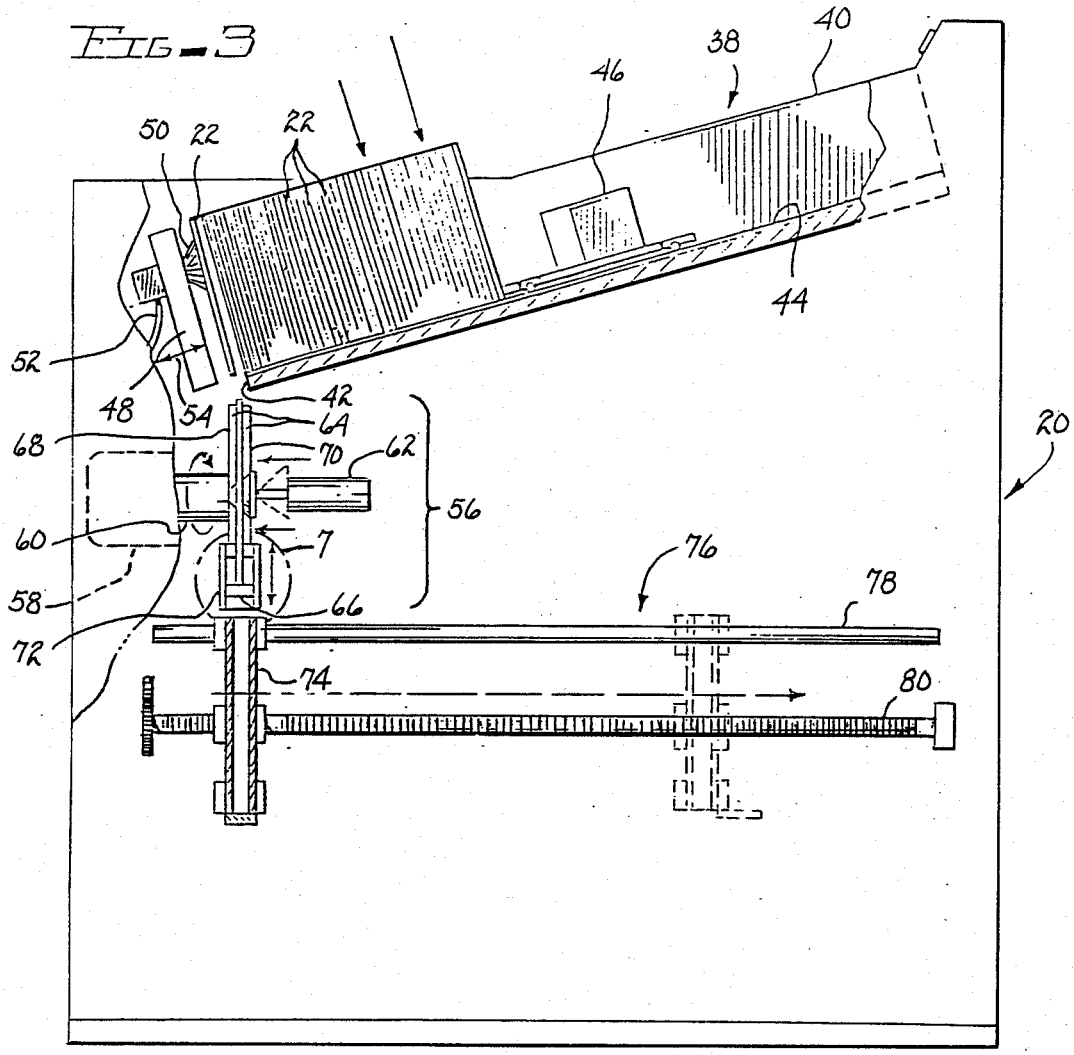
FIG. 3 illustrates, in cross-section, operative portions of the disk testing apparatus.

FIG. 3 illustrates test apparatus 20 in cross section. Preferably a 15 degree angle is used to orient test station 56 and shuttle platten 74 to provide an alignment with the 15° angle of input hopper 38; however, for illustrative purposes, the test station 56 and shuttle platten 74 are depicted in a vertical orientation. In operation, a plurality of disks 22 are loaded into the input hopper 38 of the apparatus. The input hopper includes an incline channel 40 in which the disks, in their disk jackets, stand crosswise of the channel with the broad faces of the disks perpendicular to the length of the channel. The channel has a width to easily accommodate the width of the disks and to keep the disks aligned but without binding against the channel edges. Stops at the bottom end of the channel (not shown in this view) contain the disks within the channel until a disk is removed for testing. The incline of channel 40, which is preferably about 15°, causes the disks to be pushed by gravity against the stops at the bottom 42 of the channel. To ease the movement of the disks down the incline channel, slide means 44 are positioned on the bottom of the channel. The slide means can be, for example, a pair of highly polished stainless steel rods which protrude slightly above the bottom surface of the channel. A slide weight 46 pushes against the rearmost of the disks to keep the disks compacted against the stops at the end of the channel. Slide weight 46 slides by gravity on slide rods 44.

Positioned near the lower end of channel 40 is a vacuum disk plate 48 having a vacuum suction cup 50 extending from the front surface thereof. The vacuum cup is coupled to a vacuum source (not shown) by a vacuum hose 52. The vacuum disk plate is moveable back and forth along a direction parallel to the long dimension of the channel as indicated by double ended arrow 54. The vacuum disk plate can move, for example, preferably by pneumatic control, on bearing rods (not shown). Control of the vacuum disk plate 48 and of the vacuum supplied to the vacuum cup 50 is by a microprocessor unit which, by means of its control program, coordinates the various elements of the testing apparatus.

At the prescribed time the vacuum disk plate moves forward to contact the flexible disk located at the lower end of the inclined channel. A sensor (not shown) indicates contact between the vacuum suction cup and the face of the disk. The vacuum is activated and the vacuum disk plate moves away from the end of the inclined channel to pull the flexible disk past the stops at the end of the inclined channel. The vacuum disk plate stops its motion away from the inclined channel when the disk is located directly over the test station 56. When thus properly located, and in response to a signal from the controlling microprocessor unit, the vacuum is released to allow the disk to drop into the test station.

Test station 56 includes a fixed mount drive motor 58 which provides a controlled rotation of disk drive spindle 60, and a retractable cone-nosed idler collet 62. The disk is dropped into a frame 64 having channel shaped sides and moveable bottom means 66 for initially limiting the vertical travel of the disk.

Motor 58 has a programmable speed range from about 60 to about 1500 rpm. During loading of a disk into the test station the motor is controlled to a speed of about 300 rpm. Spindle 60 is driven directly from motor 58 so it also turns at the motor speed. Spindle 60 has a spindle cup located at its end for mating with the cone-nosed idler collet 62. During loading of a disk, idler collet 62 is in the retracted position. After the disk has dropped into position against bottom stops 66, the cone-nosed collet is extended through the disk aperture to the opposite spindle cup, gently centering and seating the disk between the spindle flanges with no distortion. The spindle drive speed is then controlled to a programmable test speed to rotate the disk at this test speed. This disk loading takes only a short period of time.

During the insertion of the collet into the disk aperture, the disk jacket is clamped to hold and flaten the disc jacket but to allow the disk to rotate within the jacket. Jacket clamping is accomplished by a fixed anvil 68 positioned along the spindle side of the disk and a flexible pad 70 attached to and moving with collet 62. The pad forces the disk jacket gently but securely against the anvil.

Test station 56 also includes a read/write head assembly 72 which will be discussed more fully below. During the time when the disk is dropping into the test station and is being clamped between spindle 60 and collet 62, test head assembly 72 is raised into position to place the test heads against the disk through disk head windows 32 in disk jacket 26.

The disk is tested, as discussed below, and the test results are stored for later use. The storage includes, for example, a semiconductor RAM (random access memory) in communication with a controlling microprocessor unit. After testing the speed of motor 58 is controlled to, for example, 300 rpm, collet 62 is withdrawn from aperture 24, pad 70 is retracted to release the pressure on the disk jacket, test head assembly 72 is lowered out beneath the disk, and the bottom means 66 are moved to allow the tested disk to drop into a shuttle platten 74 of the sorting mechanism 76. The stop means 66 are preferably moveable disk stop levers which are moveable by solenoids in response to a signal from the controlling microprocessor unit. The levers are pulled out of position to allow the disk to drop into the shuttle platten.

The sorting mechanism includes a shuttle platten 74 which rides on guide means 78 (shown and described more fully below) and is driven by a lead screw 80. The test results from the testing of the disk at test station 56 are stored in memory. Based on the test results stored in memory, shuttle platten 74 is driven horizontally to a position directly over a selected one of a plurality of output locations. The output locations are categorized, and the disk is dropped, according to the test results, from the shuttle platten into a location for collection with disks having similar characteristics.

Figure 4:
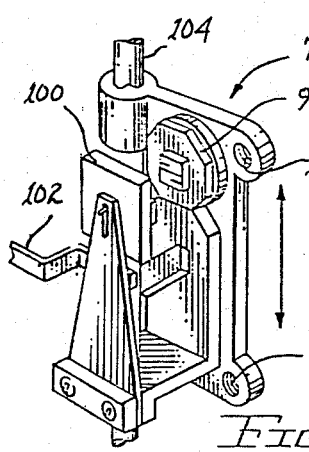
FIG. 4 illustrates, in perspective view, a read/write head assembly.

FIGS. 4–9 illustrate in more detail test head assembly 72 and its operation. As illustrated in FIG. 4, test head assembly 72 includes a first fixed test head pair 98 and a second spring load test head pair 100. During testing, the test heads are positioned to contact the front and rear surfaces of the flexible disk through the head window openings in the disk jacket. Spring loaded disk head 100 causes the two pairs of heads to be in firm contact with the disk surfaces. A lever 102 is available for manually pulling the spring loaded disk head out of contact with the disk. A disk head assembly is physically attached to shaft 104. Means (in the form of arm 108) control the vertical movement of the head assembly.

Figure 5:
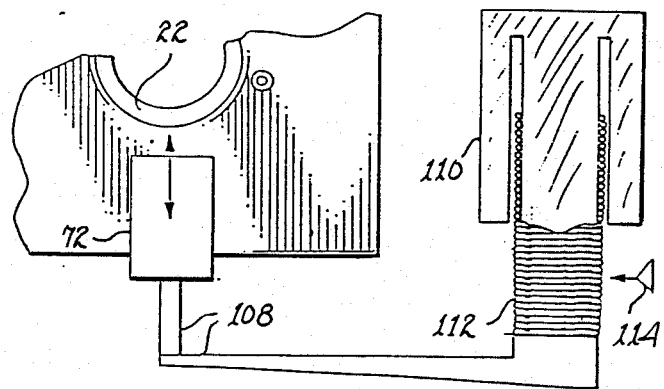
FIG. 5 illustrates position of the read/write head assembly during test and of drive means for moving the head assembly.

FIG. 5 schematically illustrates the vertical movement of the head assembly. Vertical movement is controlled by arm 108 which is connected to an air bearing assembly (not shown) that is coupled to and responsive to the movement of the wire coil assembly or actuator drive 110. Precise and controlled vertical movement of the head assembly is required to ensure that the heads are in contact with the correct track on disk 22. The precise control of the vertical movement is obtained through the use of a voice coil actuator drive 110 coupled with a ground glass scale 112 and a photo optical detector 114.

FIG. 6 illustrates the position and numbering of tracks on disk 22. Tracks are numbered from an OD at the outside of the disk to an ID located at the inside of the disk. The numbers shown in FIG. 6 depict the preferred order in which the tracks are tested. Standard track increments are only 0.020833 inch, track center-to-track center, for a 48 tracks per inch disk, 0.010417 inch for a 96 tracks per inch disk, and 0.005208 inch for 192 tracks per inch disk. Accordingly, with such fine incremental spacing, it is necessary that very precise positioning of the head assembly be maintained.

FIGS. 7 and 8 illustrate the positioning and arrangement of read/write heads on the head assembly, in accordance with the invention. FIG. 7 shows a cross-sectional view through the read/write heads and FIG. 8 illustrates a view perpendicular to that of FIG. 7. In a preferred embodiment, the dual read/write head assembly effectively tests four tracks, two tracks on each side of the disk simultaneously. Each of the dual head assemblies contains two read/write cores, spaced four tracks apart. These are represented by 116, 118 on head 98 and by 120, 122 on head 100. While core 116 is testing tracks 31, 30, 29, and 28, core 118 is testing tracks 35, 34, 33, and 32. The heads are then moved out by five tracks and core 116 beings testing tracks 23, while core 118 begins testing track 27.

The testing in this manner is shown schematically in FIG. 9. The portion of the two test heads 116, 118 on the disk surface are shown to increment one track each period during the time T1–T4. Between periods T4 and T5, the heads move outwardly by five tracks, and then again increment in one-track steps (for convenience, only the portion of head 118 is depicted in period T5).

FIG. 10 illustrates a further embodiment utilizing five read/write heads 216, 217, 218, 219, 220 and 221, 222, 223, 224, 225 on each of the heads of the head assembly. The increased number of heads allows the simultaneous testing of five tracks on each side of the disk.

FIG. 11 illustrates the ground glass scale and photo optical detector used for obtaining the precise positioning needed to move the head assembly controllably from track to track. The photo optic detector includes a light source 124 and a photo detector 126. Light from the source shines through the glass scale to the detector 126. Each track on the disk is represented by an interval of a number of grating lines on the glass scale. Track positioning is accomplished by a signal supplied to the voice coil actuator 110. The detector is coupled to the actuator and reads the grating lines on the glass scale, generating a clock pulse for each line counted. In moving up or down by one track, grating lines are counted and the voice coil movement is stopped after a desired number of up or down clock pulses have been received. The actual counting of pulses and control of the voice coil is controlled by a microprocessor unit.

FIGS. 12 and 13 illustrate the sorting mechanism in more detail. The sorter shuttle platten 74 accepts a disk dropped from the test station. The test apparatus memory contains test results obtained during testing which relate to this disk. The sort shuttle platten, in response to the results contained in memory, carries that disk to a position over the proper output location and then drops the disk at that location. The shuttle platten rides on guide means 78 which can be, for example, a pair of horizontal, parallel polished rods. The rods pass through pillow blocks 130 on a bracket 132 to which the platen is attached. The motor-driver shuttle platten 74 is moved along the guide means 78 by a lead screw 80. The lead screw, in turn, is driven by a reversible, DC shuttle motor (not shown) which is controlled in response to information about disk test results as determined by the control program of the microprocessor unit. Coupling between the shuttle motor and the lead screw is a positive drive chain (not shown). The exact positioning of the shuttle platten is controlled by a row of photo optic detectors 134 positioned on a line parallel with the lead screw that senses the platten position. Feedback from the position detectors controls the shuttle motor. One photo optic detector corresponds to each of the output locations. The photo optic detectors 134, guide means 78, and lead screw 80 are mounted on a fixed bracket 136.

FIGS. 13A and B illustrates the disk holding mechanism at the bottom of the shuttle platten. A shuttle platten has channel shaped edges 138 which control the lateral movement of the disk. The bottom of the platten is open except for moveable disk release means. These disk release means comprise, in a preferred embodiment, at least one solenoid activated lever (although two such levers are shown in FIGS. 13A and B) that can be selectively opened when the platten is positioned over the selected output location. The levers are activated at the correct time in response to test results stored in the apparatus memory. Similar release means are used, for example, as the temporary stop 66 in the test station apparatus. FIG. 13A illustrates the levers in the closed position, and, FIG. 13B illustrates the levers in the open position.

Operation of the automated disk testing apparatus, in accordance with the invention, is summarized as follows: a plurality of disk to be tested are loaded into the disk intake hopper and a slide weight is placed behind them, forcing the disks down against stops located at the lower end of the input hopper channel. The bottom disk in the hopper is contacted by the disk vacuum plate. The vacuum suction cup of the disk vacuum plate engages the disk and pulls the disk from the input hopper as the disk vacuum plate is moved away from the hopper. The disk vacuum plate positions the disk over the test station and the vacuum is controlled to idle speed, allowing the disk to drop into the test station. Prior to the time the disk drops into the test station, the collet and heads are retracted and the rotational speed of the motor is reduced. The cone nosed collet is extended through the disk aperture and into the opposite drive spindle to hold the disk securely against the drive spindle. The spindle drive speed is controlled to the programmable test speed and the test head assembly is brought into contact with the disk. A number of tests are performed to completely categorize the disk. The dual head assembly tests both sides of the disk simultaneously. In a preferred embodiment, each of the two heads contain two read/write cores so that four tracks can be tested simultaneously, two on each side of the disk. The tests are performed by moving the test head assembly up or down to prescribed tracks on the disk. Precise control of the test assembly position is maintained by a voice coil actuator assembly coupled to a precision ground glass scale and an opto detector precision position sensor. After the disk has been fully characterized, the test head assembly is moved out of the test position, motor speed is reduced, the retractable collet is removed and the tested disk is allowed to drop into a sort shuttle platten. Test results obtained and stored during the testing of the disk control the movement of the sort shuttle platten to a position over a preselected output location. The output locations are categorized to correspond to different disk qualities including reject, good one side, good other side, and various gradations of good either or both sides.

During the sort operation, another disk is dropped into test position. Total test time, including testing and sorting, is therefore reduced by overlapping the functions.

At each of the output locations, the user of the test apparatus provides collection means for collecting the tested and sorted disks. The collection means can be, for example, a collection box, with a separate box being placed at each of the output locations. When a box is filled with tested disks of similar characteristics, the box is replaced with an empty box. Alternatively, the collection means can be, for example, a plurality of conveyor belts, one for each output location, which convey the tested disks outside the apparatus to collection points. The conveyor belts (not shown), can also convey the disks through an opening illustrated by the opening 150 in FIG. 1, but it is preferred to utilize the common belt system or arrangement as shown. Thus it is apparent that there has been provided, in accordance with the invention, an automated test apparatus and method for the testing of flexible disks which fully meets the objects and advantages set forth above. The invention has been described by reference to specific illustrative embodiments, but it is not intended that the invention be limited to these illustrative embodiments. Those skilled in the art will recognize, after review of the foregoing discussion, that variations and modifications differing from the illustrative embodiments are possible without departing from the spirit and scope of the invention. Accordingly, it is intended to encompass all such variations and modifications that fall within the appended claims.

We claim:

1. An automated disk testing apparatus comprising, : means for assembling a plurality of disks and associated packages for testing; interface means for applying signals to and receiving signals from each of said disks; means for coupling each of said plurality of disks to said interface means; first means for conveying each of said disks, singularly, from said means for assembling to said means for coupling, said first means for conveying releasing said each disk into said means for coupling,
   said means for coupling releasing said each disk after an exchange of signals; and means for receiving and conveying each of said released disks to an output location, said means for receiving and conveying responsive to said signals exchanged with said interface means.

2. The apparatus of claim 1 wherein said means for assembling comprises an inclined hopper having a length and a width, said width to accommodate said disks positioned perpendicular to said length.

3. The apparatus of claim 2 wherein said means for assembling further comprises stops located at the lower end of said inclined hopper to restrain said disks therein.

4. The apparatus of claim 3 wherein said first means for conveying comprises movable vacuum means for individually removing one of said plurality of disks from said inclined hopper, pulling said one of said plurality of disks past said stops and dropping said one of said plurality of disks into said means for coupling.

5. The apparatus of claim 1 wherein said means for coupling comprises motor means having a rotating spindle and a movable collet for engaging said spindle, said collect movable to center and engage said flexible disk with said rotating spindle; and wherein said interface means comprises a read/write head assembly for
   applying signals to and receiving signals from .
   said flexible disk.

6. The apparatus of claim 1 wherein said interface means comprises electronic signal storage.

7. The apparatus of claim 6 wherein said signal storage comprises a semiconductor RAM.

8. The apparatus of claim 1 wherein said means for receiving and conveying to said output location comprises a shuttle driven in response to said exchanged signals.

9. The apparatus of claim 8 further including location means for said shuttle compris ing a plurality of photo optical detectors.

10. An automated disk testing apparatus comprising, : interface means individually exchanging signals with each of a plurality of disks, each disk having an associated package; input means for serially conveying each of said disks to said interface means ; said means for conveying releasing one of said disks into said interface means, said interface means including means for releasing a disk stored therein after said signals have been exchanged with said interface means; and, output means for receiving said released disks and conveying said disks to output locations in respons e to said
   exchanged signals, said conveying means including means to release said disks into said output locations.

11. The apparatus of claim 10 wherein said
   interface means comprise means for individually rotating each of said plurality of disks at a test rotation speed; and a read/write head assembly.

12. The apparatus of claim 11 wherein said read/write head assembly comprises a first fixed test head for testing a first side of each of said plurality of disks and a second spring loaded test head for testing a second side of each of said plurality of disks.

13. The apparatus of claim 12 wherein each of said first and second test heads comprise at least dual read/write cores.

14. The apparatus of claim 12 wherein each of said first and second test heads comprise a plurality of dual read/write cores.

15. A method for automatically handling flexible disks and associated jackets, said method comprising the steps of: loading a plurality of flexible disks into an input hopper; individually removing said flexible disks from said input hopper and releasing said flexible disks into a holder device;
   coupling each of said flexible disks
   in said holder device to an interface device, exchanging signals between said disk and said interface device, and releasing said disk in said holder device into a shuttle holder; conveying each of said disks in said shuttle holder to a selected output location; said output location selected in response to said exchanged signals; and, releasing said disk in said shuttle holder into said selected output location.

16. The method of claim 15 wherein said input hopper has a length and is inclined along said length and said plurality of flexible disks are positioned perpendicular to said length.

17. The method of claim 15 wherein said disks are pulled from said input hopper by a movable vacuum plate.

18. The method of claim 17 wherein said disks are released from said movable vacuum plate into said holder device.

19. The method of claim 15 wherein said step of exchanging signals comprises simultaneously exchanging signals on both sides of said flexible disk.

20. The method of claim 19 wherein said step of exchanging signals comprises simultaneously exchanging signals on multiple tracks on both of said sides.

* * * * *